Sept. 13, 1938.   R. FOUQUES ET AL   2,129,757
COMMUTATOR BRUSH CONTROL
Original Filed June 5, 1936   2 Sheets-Sheet 1

INVENTORS
Raoul Fouques
and Jacques Lenfant
BY
Blair O Kilgannon
ATTORNEYS

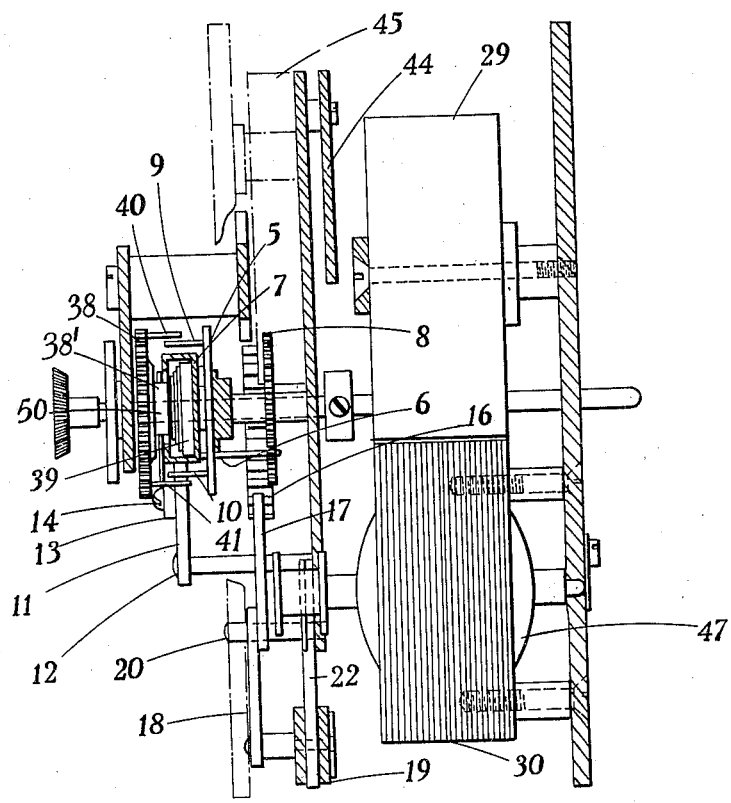

Patented Sept. 13, 1938

2,129,757

UNITED STATES PATENT OFFICE 2,129,757

COMMUTATOR BRUSH CONTROL

Raoul Fouques and Jacques Lenfant, Paris, France

Original application June 5, 1936, Serial No. 83,739. Divided and this application May 5, 1937, Serial No. 140,938. In France July 3, 1935

4 Claims. (Cl. 171—323)

The present application is a division of application Serial No. 83,739, filed June 5, 1936.

The use of very low-power motors in transportable apparatus, such as clocks for example, has hitherto been attended with a certain number of drawbacks which have not been solved in a practical manner.

In effect, if an electrically wound transportable clock is considered, it is necessary, in order to be able to interest the public, on the one hand, that its space requirement shall be as small as possible and, on the other, that the electrical energy necessary for the winding operation shall be sufficiently low for the supply battery to last one or more years.

The conditions of space requirement lead to the adoption of a low-voltage battery and the conditions of life of the battery necessitate that the output of the winding current shall be of low intensity.

A clock should, above all, be of very certain operation. On the other hand, the starting and stopping of the winding motor can be obtained only by successive opening and closing of its supply circuit. It is therefore indispensable that this circuit-closing should take place without fail during several years without it being necessary to resort to frequent inspection of the mechanism.

The low value of the voltage and of the intensity do not allow of employing in practice the closing of an ordinary contact for effecting the starting of the motor. In effect, the presence of dust and the oxidation of the contacts as a consequence of the frequent breaking of the circuit have the result that at the end of a certain time of operation, when the contact is actuated, the circuit will no longer be closed or the contact resistance becomes such that the electrical resistance of the circuit is too high for the motor to be able to start.

To these drawbacks are added those resulting from the use of fixed brushes associated with the motor. In effect, the motor being of very low power, the spring which supports the brush on the commutator will have to exert only a slight pressure; the result of this is that the dust deposited on the commutator and the brushes is sufficient to prevent the circuit of the motor from closing. On the other hand, the soiling of the brushes and the oxidation of the commutator introduce additional resistances which are sufficiently high to prevent the starting of the motor.

To avoid the insertion of a contact in the circuit of a motor, it has been proposed to effect the opening and closing of the circuit of the motor by displacement of the brush or brushes. This solution has not given entire satisfaction. In effect, the drawbacks, already indicated, of the dust deposited on the commutator and the brushes as well as the oxidation of the brushes and the commutator still exist.

The present invention relates to a mode of execution and use of the brushes which surmounts all the drawbacks mentioned.

One of the features of the invention resides in the fact that the brushes come into engagement with the commutator by a sliding movement which causes, at the point of contact, the cleaning of the commutator and the brushes.

Another feature of the invention resides in the fact that the spacing of the brushes is less than the diameter of the commutator so as to increase the wiping surface of the brushes on the commutator at the moment of contacting.

Another feature of the invention resides in the fact that the brushes are of knife form, which allows of obtaining effective cleaning and of adopting a sufficient pressure without introducing an excessive frictional resistance. This form of the brushes has, on the other hand, the effect of suppressing the "microphonic" effect which is manifested with low voltages and prevents the electrical circuit from being completed.

The invention will be better understood by reference to the following more detailed description, given by way of non-limiting example, of the construction of a clock having a periodic winding system comprising an electric motor in accordance with this invention, and to the accompanying drawings, in which:—

Fig. 1 illustrates a complete rear view of the mechanism of the clock and of the periodic winding system. Only the members which are necessary for understanding the invention have been illustrated. Moreover, for the sake of clearness in the illustration, the rear plate supporting the members has been assumed to be removed.

Fig. 2 illustrates a sectional view of Fig. 1 along the line 4—4.

Figure 1:
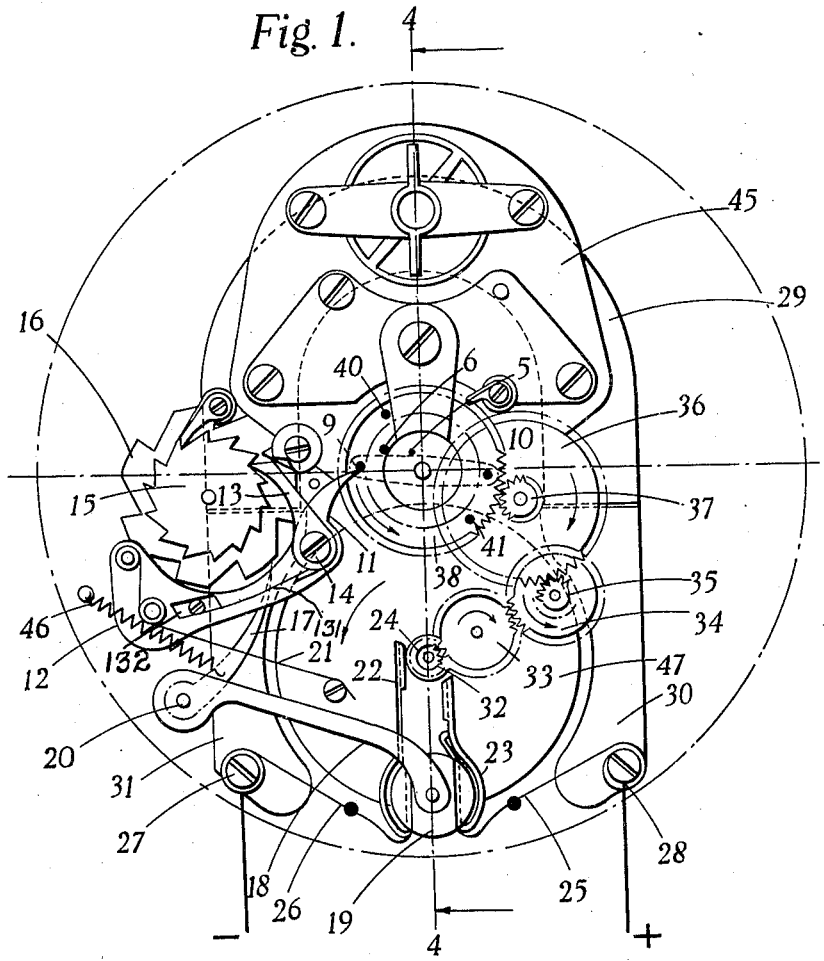

The operation of the periodic winding system will now be explained with reference to these figures.

It is seen that, in the position shown in the figures, the member 5 for starting the winding operation is engaged and driven by the pin 6 rigidly connected to the cylinder 7. The said pin 6 also entrains the toothed wheel 8 in gear with the usual clock mechanism, the details of which have not been illustrated. In this manner, therefore, the normal driving of the clock mechanism is obtained by the action of a spring 39 within or otherwise associated with the cylinder or barrel 7, which drives the mechanism through the pin 6, as has just been explained. The pin 6 will therefore effect a rotating movement about the axis of the cylinder in the direction indicated by the arrow in Fig. 1 (anti-clockwise as viewed in the figure). In the example illustrated, it has been assumed that the said pin travels a complete revolution in one hour.

The winding member 5, which can rotate freely about its axis, has two diametrically-opposed pins 9 and 10. This arrangement of the pins has been adopted in order to obtain winding every half hour. As a result of the member 5 being entrained by the pin 6, one of the pins 9, 10 will engage every half hour with the starting and stopping lever 11.

Assume, as has been illustrated in Fig. 1, that the pin 9 engages the extremity of the lever 11. When the member 5 is further entrained by the pin 6, the pin 9 will displace the lever 11, which pivots about the axis 12 and carries along the pawl 13, the pivot 14 of which is rigidly connected to the said lever 11. The pawl 13 is held against the ratchet wheel 15 by means of a spring 131 secured to a block 132 on the lever 11. When the pin 9 has caused a certain displacement of the lever 11, the pawl 13 leaves the tooth of the ratchet wheel 15 on which it rested, and falls into the following tooth. Shortly after this action, the pin 9, continuing its rotary movement, releases the lever 11 which, under the action of the spring 21, returns to its initial position. During its return movement, the lever 11 carries along the pawl 13 which acts on the ratchet wheel 15, causing an anti-clockwise rotation of the said wheel corresponding to the advancement of one tooth.

Mounted rigidly on the same axis as the ratchet wheel 15 is a cam disc 16, on which bears the extremity of the arm 17 of a double-armed lever 17, 18 fulcrumed at 20. At the extremity of the second arm 18 is mounted an insulating member 19 supporting the two brushes 22 and 23 associated with the commutator 24 of the rotor 47 of an electric motor.

As shown in Figs. 1 and 2 the working ends of the brushes are L-shaped in cross-section and are arranged so that one edge of the L is adapted to engage the commutator. In the position illustrated in Fig. 1, the arm 17 bears against a projection on the cam disc 16 and only the brush 22 is in engagement with the commutator 24. The supply circuit of the motor is open.

When, as has been explained, the ratchet wheel advances by one tooth under the action of the pawl 13, the cam disc 16 is also thereby entrained which causes the extremity of the lever arm 17 to enter a recess in the cam disc 16, under the action of the spring 46. This movement of the arm 17 raises the arm 18 pivotally about its axis 20, causing an upward displacement of the brushes 22 and 23, so that the brush 23 comes into engagement with the commutator 24 and the rotor 47 of the electric motor is started by an electric current, from a supply battery or equivalent source, flowing through the flexible conductors 25 and 26 connected to the terminals 27 and 28. The inductive flux necessary for the operation of the motor is furnished by the magnet 29 ending in the two pole pieces 30 and 31.

It will be noted that the brushes are positioned by sliding them across the commutator, which has a cleaning action, ensuring good electrical contact while preventing the introduction of additional contact resistances.

During its rotating movement, the rotor 47 drives the toothed wheel 38, rotatably mounted on the shaft 50, for winding the spring 39, through the intermediate gear wheels 32 to 37. On the wheel 38 are mounted two diametrically-opposed pins 40 and 41. After a period of winding of the spring corresponding to about half an hour of operation of the clock, one of the pins 40, 41 engages the extremity of the lever 11 and causes the advancement of the ratchet wheel 15 by one tooth, in the same manner as has been described with reference to the pins 9, 10 for starting the winding system. However, in this case, the extremity of the arm 17, which rested in a recess in the cam disc 16, is lifted onto a projection by the movement of the said cam disc. Thus, in this case, the displacement of the arm 17 lowers the arm 18 to restore the brushes to the position shown in the Fig. 1. The brush 23 is disengaged from the commutator 24 and the supply current to the motor is cut off.

However, owing to its inertia, the rotor 47 will continue rotating for a short time after the current is interrupted, which will allow the pin 40 to disengage the extremity of the lever 11 so as not to interfere with the succeeding operation of starting the winding. This additional rotation of the rotor will also assist in cleaning the commutator 24, after interruption of the current, by the action of the brush 22 which is still in engagement with the commutator.

The succeeding winding operation will be effected under the action of the pin 10 of the member 5 and stopping will be effected by the action of the pin 41 of the winding wheel 38.

Figures 3, 4:
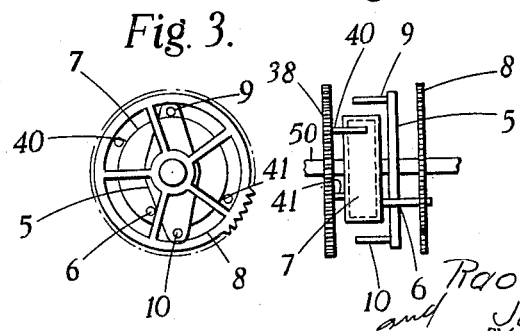
Fig. 3 is a front view of the assembly of the cylinder, starting member, winding wheel and driving wheel of the time mechanism.
Fig. 4 is a side view of the assembly of Fig. 3, the different members having been spaced in order to show their arrangement more clearly.

The winding wheel 38 is integral with a collar 38' (shown in Fig. 2 but omitted from Fig. 4 for the sake of clearness) to which is connected one end of the spring 39 arranged in the barrel 7. The other end of the spring 39 is connected to the barrel 7 so that unwinding of the spring rotates the barrel to advance the pin 6.

The method of operation of the device is as follows:—

The spring 39 drives the barrel 7 whereby the pin 6 is advanced to rotate the member 5 and also the toothed wheel 8 which drives the clock mechanism. In this manner the member 5 rotates until either the pin 9 or 10 engages with the starting and stopping lever 11. Continued movement of the pin moves the lever 11 and the pawl 13 whereby the pawl engages with the next following tooth of the ratchet wheel 15. Shortly thereafter the pin 9 disengages from the end of the lever 11 whereby the spring 21 returns this lever and the pawl 13 to their initial position thereby advancing the ratchet wheel forward by one tooth.

The movement of the ratchet wheel simultaneously advances the cam disc 16, and the end of the arm 17 of the double armed lever 17, 18 moves into a recess in the cam disc, thereby permitting the spring 46 to rotate the double armed lever 17, 18 and move the brush 23 into engagement with the commutator to start the electric motor. Through the gear wheels 32 to 37 the winding wheel 38 is rotated to rewind the spring 39. In rotating the winding wheel 38, however, the pins 40, 41 are advanced and one of them (for example 40) also engages with the starting and stopping lever 11 to move the pawl 13 over the next following tooth of the ratchet wheel 15. On continued movement of the pin 40 the lever is released whereby the ratchet wheel is again advanced by one tooth. Simultaneously the cam disc 16 is advanced to move the lever arm 17 on to a projection thereof whereby the brushes are moved away from the commutator to stop rewinding the motor.

It is obvious that the member 5 may be given any desired form and may be provided with any number of pins for effecting winding after a definite length of time, and the drive of the mechanism of the clock by a pin rigidly connected to the cylinder may be replaced by a toothed-wheel drive.

The usual clock mechanism is protected from the action of the magnet 29 of the electric motor by a magnetic screen 44.

Although a specific embodiment of the invention has been described and illustrated, it will be clearly understood that many modifications and variations will be apparent to those skilled in the art which fall within the invention as defined in and by the appended claims.

We claim:

1. In an electric motor, a commutator, brushes of knife form cooperating with said commutator the knife edge only of said brushes being adapted to engage said commutator and means for imparting to at least one of said brushes a sliding movement across said commutator to move the knife edge of the same into and out of contact with said commutator.

2. In an electric motor, a commutator, brushes cooperating with said commutator and means for imparting to at least one of said brushes a sliding movement across the said commutator to move the same into and out of contact with said commutator, said brushes being spaced apart when one at least is out of contact with said commutator at a distance less than the diameter of the commutator.

3. In an electric motor, a commutator, a pair of brushes cooperating with said commutator, a brush holder to which said pair of brushes is anchored, and means for moving said brush holder bodily towards and away from said commutator, at least one of said brushes being of insufficient length to make contact with said commutator when the brush holder is in its position furthest from said commutator.

4. In an electric motor, a commutator, a pair of brushes cooperating with said commutator, a brush holder to which said pair of brushes is anchored, and means for moving said brush holder bodily towards and away from said commutator, at least one of said brushes being of insufficient length to make contact with said commutator when the brush holder is in its position furthest from said commutator, said brushes being spaced apart when one at least is out of contact with said commutator at a distance less than the diameter of said commutator.

RAOUL FOUQUES.
JACQUES LENFANT.